United States Patent [19]

Heitz et al.

[11] Patent Number: 5,103,632
[45] Date of Patent: Apr. 14, 1992

[54] SEAL FOR A STORED ENERGY COMBUSTOR

[75] Inventors: Steve Heitz, Rockford, Ill.; Robert W. Smith, Lakeside; Jack R. Shekleton, San Diego, both of Calif.

[73] Assignee: Sundstrand Corporation, Rockford, Ill.

[21] Appl. No.: 472,217

[22] Filed: Jan. 29, 1990

[51] Int. Cl.⁵ .................... F02C 7/32; F02C 3/05
[52] U.S. Cl. .................... 60/39.32; 60/39.36; 60/760
[58] Field of Search .......... 60/39.36, 760, 39.32, 60/39.75

[56] References Cited

U.S. PATENT DOCUMENTS

| | | | |
|---|---|---|---|
| 2,709,338 | 5/1955 | Morley et al. | 60/39.32 |
| 3,670,497 | 6/1972 | Sheldon | 60/39.32 |
| 3,826,084 | 7/1974 | Branstrom et al. | 60/39.75 |
| 4,016,718 | 4/1977 | Lauck | 60/39.32 |
| 4,640,092 | 2/1987 | Coburn et al. | 60/39.75 |
| 4,688,378 | 8/1987 | Harris | 60/39.75 |

Primary Examiner—Richard A. Bertsch
Assistant Examiner—Timothy S. Thorpe
Attorney, Agent, or Firm—Wood, Phillips, Mason, Recktenwald & VanSanten

[57] ABSTRACT

Difficulties in accommodating thermal growth in a combustor for providing hot gases of combustor to drive, for example, a turbine wheel (10) are avoided in a combustor construction, including a housing (36) defining a combustion chamber having a relatively narrow inlet (38), an enlarged combustion area (42) and a relatively narrow outlet (40) opposite of the inlet (38). A fuel injector (46) is disposed in the inlet (38) for injecting fuel (50) at least into the combustion area (42) and a plenum case (56) surrounds the housing (36) in generally spaced relation. The plenum case (56) is adapted to be connected to a source (62) of oxidant under pressure and is in fluid communication with the inlet (38) to provide oxidant thereto to support combustion of fuel in the combustion area (42). A conduit (44) extends from the outlet (40) to be connected to a turbine nozzle (16) and a diaphragm (122) is interposed and sealingly engages both the housing (36) and the plenum case (56) near the outlet (40). A first labyrinth seal (116) is located on one side of the diaphragm (122) and between the housing (36) and the plenum case (56) while a second labyrinth seal (104) is located on the other side of the diaphragm (122) and is disposed between the plenum case (56) and the conduit (44).

8 Claims, 2 Drawing Sheets

SEAL FOR A STORED ENERGY COMBUSTOR

FIELD OF THE INVENTION

This invention relates to gas turbine engines, and more particularly, to an auxiliary combustor that may be utilized for rapidly starting gas turbine engines at high altitudes or the like.

BACKGROUND OF THE INVENTION

So called "fly-by-wire" aircraft are typically extremely sophisticated and powered by jet engines. In such aircraft, there is no direct mechanical connection between the controls operated by the pilot and the control surfaces on the aircraft itself. Rather, electrical and/or hydraulic circuits interconnect the controls and the control surfaces. Thus, in order for control of the control surfaces to be effective, it is necessary that there be some source of power, such as an electric generator or a hydraulic pump or both. In the usual case, such components are driven by the main propulsion engine or engines of the aircraft and in normal operation, no difficulties are encountered.

However, there is always the possibility that the power source will be disabled as a result of flame out of the main propulsion engine or engines and when that occurs, control over the aircraft is lost since there is no power to alter control surfaces in response to pilot commands.

The difficulty is accentuated at high altitude because of the difficulty of restarting turbine engines at such altitudes.

It has, therefore, been proposed to provide an emergency power unit for such aircraft. The emergency power unit frequently is a small gas turbine engine employed to drive an electric generator or a hydraulic pump or both in an emergency situation. In the usual case, it is necessary that such an emergency power unit be capable of being brought from a fully quiescent state to full operation in two-three seconds. And while starting of such an emergency power unit at low altitude does not pose much of a difficulty, at high altitudes, it is just as susceptible to difficult starting as the main propulsion engines of a typical aircraft.

In order to provide for rapid starting at altitudes, various systems have been proposed In one, hydrazine is caused to decompose and the resulting gases directed against a turbine wheel with an auxiliary nozzle. The turbine wheel is thus accelerated and caused to drive a compressor, which in turn provides compressed air to a conventional combustor so as to allow combustion of fuel therein to provide the gases of combustion to drive the turbine wheel through a main nozzle. This system has not found a great deal of favor because of the nature of hydrazine.

In other systems, a compressed oxidant is stored in a storage vessel and the gas turbine engine of the emergency power unit provided with an axillary combustor The stored oxidant is utilized to oxidize fuel within the axillary combustor and the resulting gases of combustion are employed to accelerate the turbine wheel. The turbine wheel in turn drives a compressor and when self-sustaining speed is reached, the same operates normally as a gas turbine engine and use of the axillary combustor may be terminated.

Because of the need to render the emergency power unit operable within just a few seconds, substantial internal temperature rises are caused to occur within a very short period of time, requiring that considerable effort be taken to accommodate thermal expansion of the various components. If this is not done properly, extremely flammable gases and oxidant flowing through expansion joints in the construction may come in contact with each other at undesired locations and cause a rapid burnout of system components.

The present invention is directed to overcoming one or more of the above problems.

SUMMARY OF THE INVENTION

It is the principal object of the invention to provide a new and improved combustor that may be utilized in an emergency power unit, including a turbine. More specifically, it is an object of the invention to provide such a combustor wherein thermal expansion and contraction of the components is readily accommodated, while means are provided to positively seal the junctions of various components to prevent undesired mixing of oxidant and highly flammable gases.

According to one facet of the invention, there is provided a combustor which includes a housing defining a combustion chamber having a relatively narrow inlet, and enlarged combustion area and a relatively narrow outlet opposite of the inlet. A fuel injector is located in the inlet for injecting fuel at least into the combustion area and a plenum case surrounds the housing in generally spaced relation thereto. The resulting plenum is adapted to be connected to a source of oxidant under pressure and is in fluid communication with the inlet to provide oxidant thereto to support combustion of fuel in the combustion area. A conduit is adjoined to the outlet and adapted to be connected to a turbine nozzle. The conduit is arranged so as to extend from the plenum case.

According to one facet of the invention, a diaphragm is interposed between and sealingly engages both the housing and the plenum case near the outlet.

According to another facet of the invention, a flexible seal is disposed between the housing and the plenum case and sealingly engages both. A first labyrinth seal is located on one side of the flexible seal and between the housing and the plenum case while a second labyrinth seal is located on the other side of the flexible seal and between the housing and the conduit.

According to a preferred embodiment of the invention, the flexible seal is a diaphragm as mentioned previously.

According to the invention, the diaphragm provides a seal that may move relative to the various components as they expand or contract as a result of thermal growth. At the same time, the labyrinth seals allow slow equalization of pressure on both sides of the diaphragm during operation so that the diaphragm is not subjected to large pressure differentials which could cause damage thereto.

In a preferred embodiment of the invention, both of the labyrinth seals are annular and face in the radial direction. The first labyrinth seal may be carried by the housing while the second labyrinth seal is carried by the plenum.

In one embodiment of the invention, the diaphragm is ring-like and has a radially outer, axially directed flange and a radially inner flange that is axially directed oppositely from the radially outer flange. The radially outer flange is sealed to the housing adjacent the first labyrinth seal, while the radially inner flange is sealed to the plenum case adjacent the second labyrinth seal.

Preferably, the diaphragm, between such flanges, has a generally planar center and the flanges are joined to the center by rounds to avoid the creation of substantial stress in the diaphragm as the same moves in response to thermal growth.

Other objects and advantages will become apparent from the following specification taken in connection with the accompanying drawings.

DESCRIPTION OF THE PREFERRED EMBODIMENT

Figure 1:
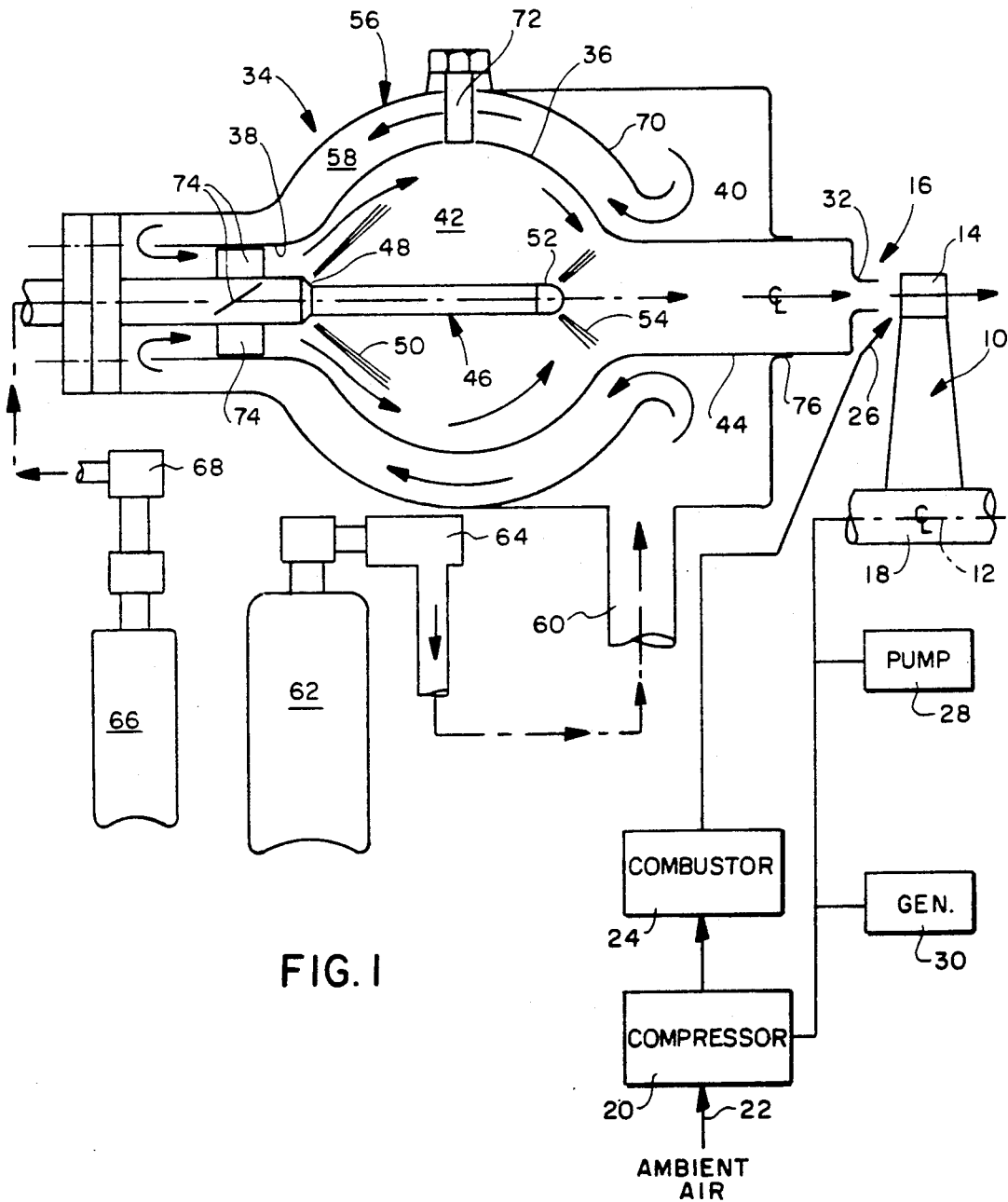
FIG. 1 is a somewhat schematic, sectional view and block diagram of an emergency power unit of the type with which a combustor of the invention is adapted to be used.
Figure 2:
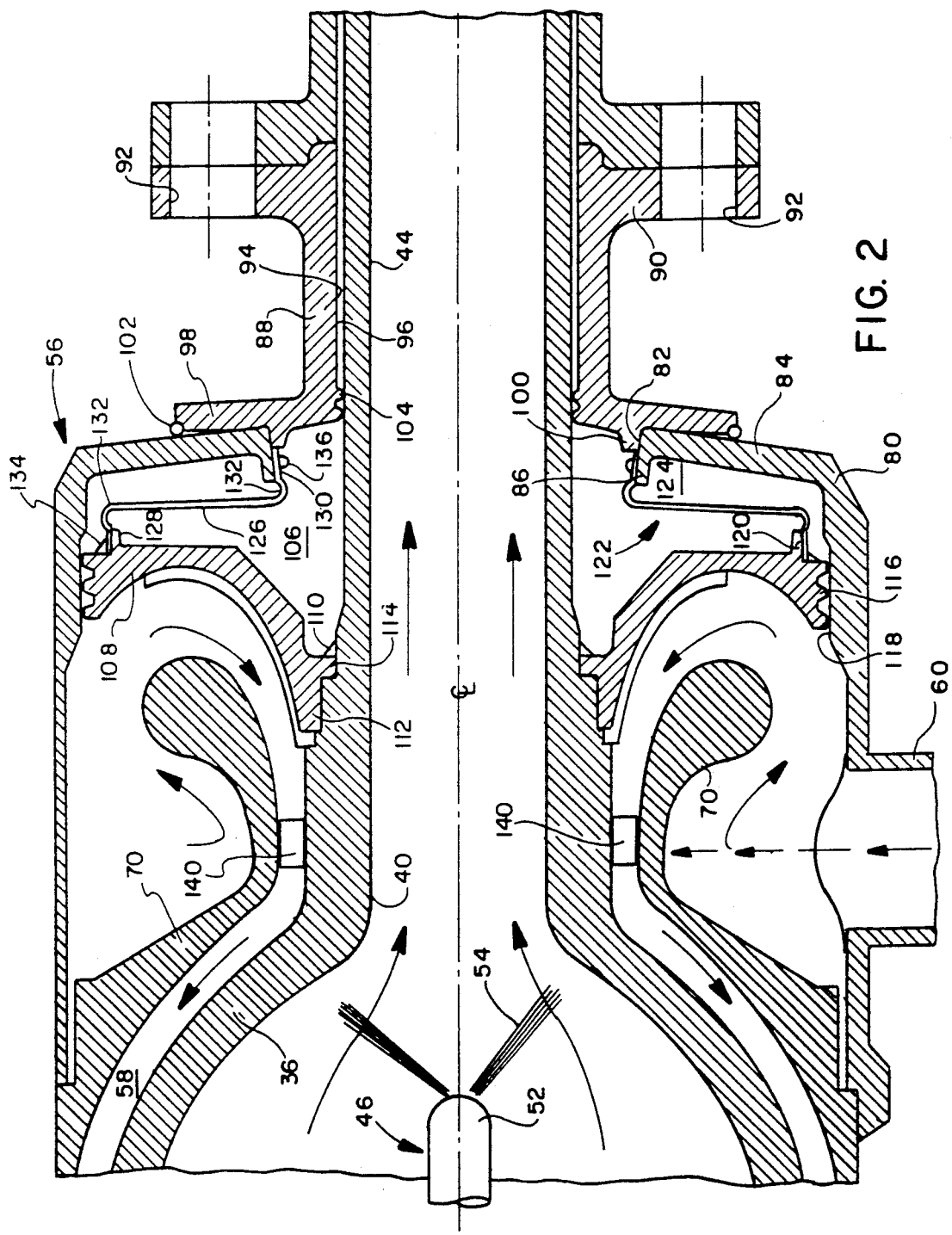
FIG. 2 is an enlarged, fragmentary view of the combustor.

An exemplary embodiment of the invention is illustrated in the drawing in which FIG. 1 provides an overview of the emergency power unit system while FIG. 2 illustrates mechanical detail of one embodiment of the invention. Referring to FIG. 1, a gas turbine engine is somewhat schematically illustrated. The same includes a turbine wheel, generally designated 10, which is adapted to be rotated about an axis 12 in response to the direction of hot gases of combustion against turbine vanes or blades 14 by means of a dual nozzle, generally designated 16. A shaft 18 that may rotate about the axis 12 and which is coupled to the turbine wheel 10, is also coupled to a conventional compressor 20 having an inlet 22 to the ambient. Ambient air enters the compressor through the inlet 22 and is compressed during operation of the gas turbine and passed on to a conventional combustor 24. Fuel and the compressed air are combusted within the combustor 24 and then directed by a main nozzle 26, forming part of the dual nozzle 16 against the turbine blades 14 to drive the turbine wheel 10.

Also coupled to the shaft 18 is one or more hydraulic pumps 28 and one or more electrical generators 30. As alluded to previously, power from the pump 28 and the generator 30 is utilized to power the hydraulic and/or electrical links between the controls of a fly-by-wire aircraft and its control surfaces in an emergency situation.

The components described thus far may also form part of a so-called auxiliary power unit as is well-known.

As alluded to previously, in an emergency situation, it is necessary to bring the gas turbine engine up to full operating capability within two to three seconds so that control over the aircraft is immediately restored. To do this, even in hostile environments such as high altitude, the dual nozzle 16 includes an auxiliary nozzle 32 directed at the vanes 14 for directing gases of combustion and dilution air against the vanes 14 to accelerate the turbine wheel 10 to the point where the compressor 20 is providing sufficient ambient air to the combustor 24 that combustion gases from the combustor 24 are sufficient to maintain operation of the gas turbine.

To provide the gases to the nozzle 32, an auxiliary combustor, generally designated 34, is employed.

The auxiliary combustor 34 typically, but not always, includes a spherical housing 36 defining a combustion chamber that includes a relatively narrow inlet 38 at one end and a relatively narrow outlet 40 oppositely thereof. An enlarged, intermediate combustion area 42 is located between the inlet 38 and the outlet 40.

Joined to the outlet 40 is a conduit 44 which extends to the nozzle 32.

Within the inlet 38 is a two-stage fuel injector, generally designated 46. The fuel injector 46 includes one injection nozzle 48 which injects fuel in a conical pattern 50 into the combustion area 42.

A second injector 52 injects fuel in a generally conical pattern 54 into the outlet 40 or into the combustion area 42 just slightly upstream of the outlet 40.

Surrounding the housing 36 in spaced relation thereto is a plenum case, generally designated 56. At its left hand end as viewed in FIG. 1, the interior of the plenum case 56 that is, the space or plenum 58 between the plenum case 56 and the housing 36, is in fluid communication with the inlet 38 about the fuel injector 46.

An inlet 60 to the interior of the plenum 56 is connected to a source 62 of oxidant under pressure via a control valve 64. A source 66 of fuel is also connected via a control valve 68 to the injector 46. Finally, the plenum case 56 may include an interior baffle 70 that is semi-spherical about the housing 36 and which is located to prevent incoming oxidant at the inlet 60 from impinging directly on the housing 36 to achieve a measure of flow equalization.

Typically, the housing 36 will be suspended within the plenum case 56 by three equally angularly spaced pins 72 (only one of which is shown) One of the pins 72 may also be an ignitor.

Swirling vanes 74 are typically mounted on the injector 46 to in part swirl to incoming oxidant. However, if desired, the swirler vanes 74 could be mounted to the housing 36.

In operation, the valves 64 and 68 are opened and modulated as desired to provide oxidant to the plenum 56 and fuel to the injector 46. The oxidant flows as indicated by arrows into contact with the outer surface of the housing 36 and in the plenum or space 58 to provide cooling for the housing 36 and ultimately is redirected through the inlet 38 and has swirled imparted thereto. The oxidant then encounters the cone 50 of fuel from the first injector 48 and is ignited by the ignitor 72. The gases of combustion that result ultimately flow toward the outlet 40 (there is internal recirculation within the combustion area 42 which is not material to the present invention). Upon reaching the outlet 40, fuel is sprayed from the fuel injector 52 into the hot gases of combustion. This has the effect of cooling the gases of combustion to a temperature sufficiently low that they may be applied to the vanes or blades 14 and the turbine wheel 10 without damage. It also has the effect of increasing the volume of such gases by reason of both evaporation of the fuel and by thermal cracking of the fuel.

In any event, most if not all of the fuel emanating from the nozzle 52 is not combusted so the gases flowing to the nozzle 32 for application to the turbine wheel 10 are highly combustible.

The gases of combustion accelerate the turbine wheel 10 until the gas turbine associated therewith is capable of self-sustaining operation at which time the valve 64 and 68 may be closed to terminate operation of the auxiliary combustor 34.

In the few seconds of operation that is required to bring the gas turbine up to self-sustaining speed, the combustor and associated components will be subjected to a temperature as low as ambient which may be below zero degrees Fahrenheit at high altitudes to gases at temperatures well in excess of 2000 degrees F. As a consequence, the housing 36 will undergo substantial thermal growth, both in the radial direction and in the axial direction.

Since the plenum case 56 is spaced from the housing 36, the radial growth is readily accommodated, although provision must be made therefor. However, to accommodate axial growth, some mean must be provided to accommodate the thermal growth of the hot gas conduit 44 at its point of emergence from the plenum 56 which may be quite cold by reason of the drop in temperature as the oxidant from the source 62 expands after the valve 64 is opened. This requires the presence of a slidable joint 76 and it will in turn be appreciated that this joint 76 cannot be isolated from the nozzle 32. That is to say, as viewed in FIG. 1 a path of fluid flow from the nozzle 32 to the joint 76 will exist. On the opposite side of that path is the interior of the plenum case 56 and oxidant therein. Thus, at the joint 76, without provision for a leak tight seal, there is the possibility of the mixing of the highly flammable gases with an oxidant.

Turning now to FIG. 2, the manner in which the joint 76 is sealed will be described in greater detail. The plenum case 56 is seen to include a somewhat cup shaped element 80 to which the inlet 60 is secured and which has a central opening 82 in its base 84. An axially directed flange 86 extends about the opening 82 and is directed toward the housing 36.

A seal carrying collar 88 includes a mounting flange 90 having holes 92 for receipt of bolts (not shown) by which the combustor 34 may be bolted to the gas turbine engine. The conduit 44 extends through the center opening 94 of the collar 88 inwardly thereof such that a space 96 exists to provide an interface that allows relative movement. The collar 88, oppositely of the mounting flange 90, includes a radially directed flange 98 which in turn has a pilot flange 100 receivable within the central opening 82 of the element 80. The two may be secured together as by a weld 102. A labyrinth seal 104 faces radially inward toward the conduit 44 and is annular in configuration. The radially inner surface of the labyrinth seal 104 is spaced sufficiently from the outer surface of the conduit 44 so as to accommodate thermal growth of the latter when hot gases are passing there through. At the same time, as is well-known, the labyrinth seal 104 will prevent any rapid flow of gas from the space 96 toward an annular chamber 106 on the opposite side of the labyrinth seal 104.

The chamber 106 is in part bounded by a seal carrying housing extension 108 which is secured as by a weld 110 or a braze to the housing 36 at the outlet 40. The extension 108 includes a cylindrical neck 112 fitted about the exterior of the outlet 40 as well as a radially inward directed flange 114 for positioning purposes.

At its radially outer extremity, the extension 108 carries an additional annular, radially outwardly facing labyrinth seal 116 which confronts a cylindrical surface 118 of the interior part of the element 80 comprising part of the plenum case 56. As can be readily appreciated from FIG. 2, the labyrinth seal 116 is located between the interior of the plenum case 56 that is connected to the inlet 60 and the base 84 of the cup-shaped element 80.

Closely adjacent to the labyrinth seal 116, the extension 108 carries an annular, axially directed flange 120. A flexible seal, generally designated 122, is sealed to the flange 120 as well as to the flange 86 and thus isolates the chamber 106 from a chamber 124, the latter being on the opposite side of the labyrinth seal 116 from the oxidant carrying interior of the plenum case 56.

In a preferred embodiment of the invention, the flexible seal 122 is in the form of a metal, ring-shaped diaphragm having a central, generally planar section 126, a radially outer, axially directed flange 128, and a radially inner, axially directed flange 130. The flange 130 is directed oppositely from the flange 128. Both of the flanges 128 and 130 are joined to the central section by rounds 132 to minimize stress concentrations.

The flange 128 is joined to the flange 120 on the extension 108 as by a weld 134 which also provides a seal at that interface. A similar weld 136 joins and seals the flange 130 to the flange 86 on the element 80.

As can be appreciated from viewing in FIG. 2, the diaphragm defining the seal 122 is somewhat S-shaped in section and can flex to allow relative movement between the housing extension 108 on one hand and the element 80 forming part of the plenum case 56 on the other. A fluid tight seal between the interface of those elements is defined by the diaphragm defining the seal 122 so as to prevent any highly combustible gases in the space 96 from mixing with oxidant entering the inlet 60.

Because during start up, an initial pressure of, say, 100 psi may be present at the inlet 60 upon opening of the valve 64 (FIG. 1) and, because, on the ensuing ignition of fuel within the combustion area 42, the pressures thereat may immediately jump to, say, 300 psi, which in turn may mean a pressure of 300 psi within the space 96 between the conduit 44 and the collar 88, without the labyrinth seals 104 and 116, a substantial pressure differential would exist across the diaphragm defining the seal 122. Indeed, the pressure differential could be sufficient to damage the diaphragm and if the seal provided thereby were broken as a result, oxidant and highly combustible gases could mix in the area occupied by the chambers of 106 and 124.

Such an exposure to a high pressure differential is, however, avoided since, while the labyrinth seals 104 and 116 do not provide a tight seal at their respective locations, they sufficiently slow the flow of fluid into the chambers 106 and 124 on opposite sides of the seal 122 so that no large pressure differential can ever exist even in response to large and rapid pressure changes. Consequently, the diaphragm defining the seal 122 is not subject to possibly damaging pressure differentials.

From the foregoing, it will be readily appreciated that a combustor made according to the invention is ideally suited for use in a so-called stored energy system that may be employed to rapidly initiate operation of an emergency power unit or the like. The use of pins such as the pin 72 and the spacing of the plenum case 56 from the housing 36 defining the combustor readily accommodates thermal growth in the radial direction and, if desired, spacers, such as those illustrated at 140 may be utilized to provide slip fits while maintaining radial spacing. The unique use of the diaphragm in combination with the labyrinth seals 104 and 116 provides a positive seal while allowing thermal expansion and contraction in the axial direction. Importantly, such a seal is not subjected to high levels of stress resulting from large pressure differentials through the unique use of the labyrinth seals.

We claim:

1. A combustor for providing hot gases of combustion to drive a turbine wheel, comprising:
   a housing defining a combustion chamber having a relatively narrow inlet, an enlarged combustion area and a relatively narrow outlet opposite of said inlet;
   a fuel injector in said inlet for injecting fuel at least into said combustion area;
   a plenum case surrounding said housing in generally spaced relation to define a plenum adapted to be connected to a source of oxidant under pressure, said plenum being in fluid communication with said inlet to provide oxidant thereto to support combustion of fuel in said combustion area;
   a conduit adjoined to said outlet and adapted to be connected to a turbine nozzle, said conduit extending from said plenum case;
   a diaphragm interposed between and sealingly engaging both said housing and said plenum case near said outlet; and
   a labyrinth seal located between said diaphragm and at least one of said housing and said plenum case.

2. A combustor for providing hot gases of combustion to drive a turbine wheel, comprising:
   a housing defining a combustion chamber having a relatively narrow inlet, an enlarged combustion area and a relatively narrow outlet opposite of said inlet;
   a fuel injector in said inlet for injecting fuel at least into said combustion area;
   a plenum case surrounding said housing in generally spaced relation and adapted to be connected to a source of oxidant under pressure, said plenum case being in fluid communication with said inlet to provide oxidant thereto to support combustion of fuel in said combustion area;
   a conduit adjoined to said outlet and adapted to be connected to a turbine nozzle, said conduit extending from said plenum case; and
   a diaphragm interposed between and sealingly engaging both said housing and said plenum case near said outlet, said diaphragm being ring shaped and located about said conduit and further being S-shaped in section.

3. A combustor for providing hot gases of combustion to drive a turbine wheel, comprising:
   a housing defining a combustion chamber having a relatively narrow inlet, an enlarged combustion area and a relatively narrow outlet opposite of said inlet;
   a fuel injector in said inlet for injecting fuel at least into said combustion area;
   a plenum case surrounding said housing in generally spaced relation and adapted to be connected to a source of oxidant under pressure, said plenum case being in fluid communication with said inlet to provide oxidant thereto to support combustion of fuel in said combustion area;
   a conduit adjoined to said outlet and adapted to be connected to a turbine nozzle, said conduit extending from said plenum case;
   a diaphragm interposed between and sealingly engaging both said housing and said plenum case near said outlet;
   a first labyrinth seal located on one side of said diaphragm and between said housing and said plenum case; and
   a second labyrinth seal on the other side of said diaphragm and between said plenum case and said conduit.

4. A combustor for providing hot gases of combustion to drive a turbine wheel, comprising:
   a housing defining a combustion chamber having a relatively narrow inlet, an enlarged combustion area and a relatively narrow outlet opposite of said inlet;
   a fuel injector in said inlet for injecting fuel at least into said combustion area;
   a plenum case surrounding said housing in generally spaced relation and adapted to be connected to a source of oxidant under pressure, said plenum case being in fluid communication with said inlet to provide oxidant thereto to support combustion of fuel in said combustion area;
   a conduit adjoined to said outlet and adapted to be connected to a turbine nozzle, said conduit extending from said plenum case;
   a flexible seal interposed between and sealingly engaging both housing and said plenum case near said outlet;
   a first labyrinth seal located on one side of said flexible seal between said housing and said plenum case and
   a second labyrinth seal on the other side of said flexible seal and between said plenum case and said conduit.

5. The combustor of claim 4 wherein both said labyrinth seals are annular and face in the radial direction.

6. The combustor of claim 5 wherein said first labyrinth seal is carried by said housing and said second labyrinth seal is carried by said plenum case.

7. The combustor of claim 6 wherein said flexible seal is a ring-like diaphragm having a radially outer, axially directed flange and a radially inner flange axially directed opposite from said radially outer flange, said radially outer flange being sealed to said housing adjacent said first labyrinth seal and said radially inner flange being sealed to said plenum case adjacent to second labyrinth seal.

8. The combustor of claim 7 wherein said diaphragm, between said flanges, has a generally planar center and said flanges are joined to said center by rounds.